US008563863B2

(12) United States Patent
Carlson

(10) Patent No.: US 8,563,863 B2
(45) Date of Patent: Oct. 22, 2013

(54) FLEXIBLE TUBING WITH IMPROVED SIGNAL TRANSMISSION AND METHOD OF MAKING

(76) Inventor: Eric Carlson, Laguna Hills, CA (US)

( * ) Notice: Subject to any disclaimer, the term of this patent is extended or adjusted under 35 U.S.C. 154(b) by 373 days.

(21) Appl. No.: 13/066,374

(22) Filed: Apr. 13, 2011

(65) Prior Publication Data

US 2011/0192624 A1   Aug. 11, 2011

Related U.S. Application Data

(63) Continuation-in-part of application No. 11/903,898, filed on Sep. 25, 2007, now Pat. No. 7,965,930.

(51) Int. Cl.
*H01B 7/18* (2006.01)
*H01B 11/06* (2006.01)
*B29C 63/10* (2006.01)
*B29C 53/58* (2006.01)
*F16L 53/00* (2006.01)

(52) U.S. Cl.
USPC .............. 174/108; 174/34; 156/187; 156/191

(58) Field of Classification Search
USPC ............. 174/34, 108; 156/187, 191; 392/465, 392/478; 138/33; 137/341; 219/547
See application file for complete search history.

(56) References Cited

U.S. PATENT DOCUMENTS

| | | | | |
|---|---|---|---|---|
| 3,717,746 A | * | 2/1973 | Breitweiser | 219/200 |
| 3,963,856 A | * | 6/1976 | Carlson et al. | 174/47 |
| 4,038,519 A | * | 7/1977 | Foucras | 392/472 |
| 4,336,415 A | * | 6/1982 | Walling | 174/47 |
| 4,693,324 A | * | 9/1987 | Choiniere et al. | 174/47 |
| 4,826,423 A | * | 5/1989 | Kemp et al. | 425/505 |
| 5,352,871 A | * | 10/1994 | Ross et al. | 219/633 |
| 5,637,168 A | * | 6/1997 | Carlson | 156/143 |
| 5,848,223 A | * | 12/1998 | Carlson | 392/478 |
| 6,190,480 B1 | * | 2/2001 | Carlson | 156/143 |
| 6,248,954 B1 | * | 6/2001 | Clark et al. | 174/113 R |
| 6,367,510 B1 | * | 4/2002 | Carlson | 138/121 |
| 6,537,405 B1 | * | 3/2003 | Henderson et al. | 156/195 |
| 6,932,119 B2 | * | 8/2005 | Carlson | 138/121 |
| 2003/0183294 A1 | * | 10/2003 | Carlson | 138/129 |
| 2005/0034891 A1 | * | 2/2005 | Ekeberg et al. | 174/113 R |
| 2009/0078440 A1 | * | 3/2009 | Carlson et al. | 174/47 |

* cited by examiner

*Primary Examiner* — Timothy Thompson
*Assistant Examiner* — Rhadames J Alonzo Miller
(74) *Attorney, Agent, or Firm* — Terry L. Miller

(57) ABSTRACT

A smooth-bore plastic tubing with an outer helical support bead is resistant to collapse and incorporates plural conductors disposed outside of the tubing bore and insulated both from ambient and from one another. The conductors may have a desired relatively high thermal conductivity to tidal air flow within the tubing, while also having a comparatively high thermal resistance to ambient. The conductors may be electrical conductors, or may include fiber optic conductors as well in the same tubing structure. A method for making the tubing includes extruding a molten thermoplastic ribbon with an elevated plateau portion defining at least one conductor-receiving groove. The plastic ribbon is wrapped to form a tube and at least one conductor is embedded in the groove of the plateau portion. Finally a molten thermoplastic bead is then applied atop the plateau portion and atop of the embedded conductor providing a unitary flexible tubing structure with substantially smooth inside and outside surfaces free of crevices which could retain soil or bacteria.

14 Claims, 3 Drawing Sheets

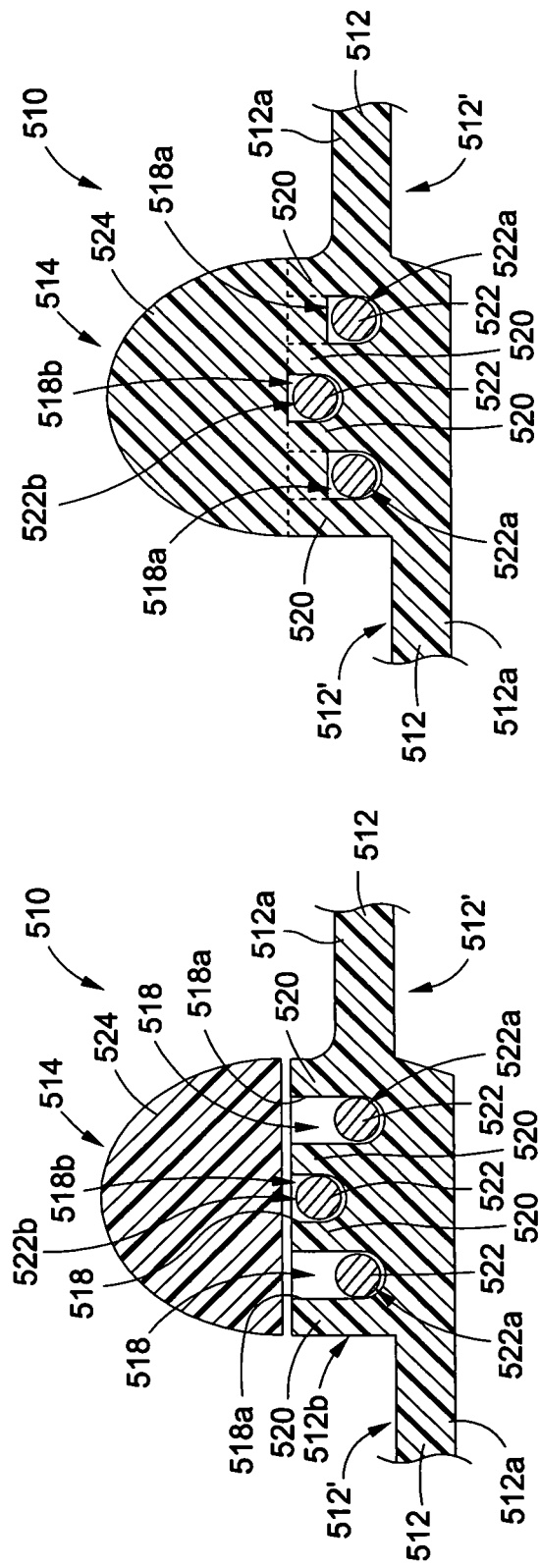

FLEXIBLE TUBING WITH IMPROVED SIGNAL TRANSMISSION AND METHOD OF MAKING

CROSS REFERENCE TO RELATED APPLICATION

Figure 1:
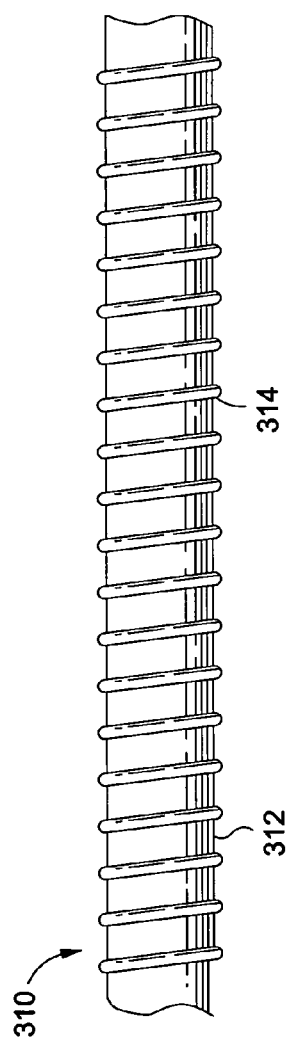

This application is a Continuation-In-Part of and allowed U.S. patent application Ser. No. 11/903,898, now U.S. Pat. No. 7,965,930, granted Sep. 25, 2007, the disclosure of which is incorporated herein by reference to the extent necessary for a complete enabling disclosure of the present invention.

BACKGROUND OF THE INVENTION

1. Field of the Invention

The present invention relates generally to collapse-resistant, flexible thermoplastic tubing, to such plastic tubing which includes plural helical conductors extending along the length of the tubing, to such a tubing providing improved signal transmission along such conductors, and to a method for making such flexible plastic tubing.

2. Description of Conventional Technology

Tubing having a relatively thin wall and an integral helical supporting bead is known in the art. Such support-bead tubing construction provides substantial crush resistance while leaving the tube wall flexible enough to permit short-radius bends without collapsing or kinking the tube. The versatility of this kind of tubing is evidenced by its wide applicability in construction, ventilation, manufacturing processes, auto washes, hospitals, medical devices, and other fields. In medical applications the necessity to maintain a clean environment dictates that the tubing be free of crevices both inside and outside because soil or bacterial contamination could reside in such crevices were they present. A smooth inner bore for the tubing is also important because flow resistance must be kept to a minimum when a tidal air flow is conducted through the tubing, as is the case with inhalation therapy, PAP, CPAP (Continuous Positive Airway Pressure) and other breathing-assistance machines.

U.S. Pat. No. 3,910,808 to Steward, assigned to the same assignee as this application, discloses apparatus for forming such thin-walled, flexible, crush resistant support-bead tubing. Steward discloses means for extruding a plastic strip having a longitudinal rib, and winding means for helically winding the strip about an axis to produce a corrugated flexible tubing having a smooth bore.

Further, U.S. Pat. No. 5,454,061, also to Steward, discloses apparatus for forming such thin-walled, flexible, crush resistant support-bead tubing also including a helically disposed conductor. Steward '061 discloses a tubing in which the conductor is disposed adjacent to overlapping side edges of an extruded plastic strip or ribbon, which is wrapped helically on itself while molten to form the tubing wall. The overlapped edges of the ribbon as well as the conductor are then helically covered with an extruded molten bead, which also bonds with and becomes an integral part of the tubing.

With the Steward '061 tubing, and with other conventional tubing, when plural conductors are disposed in the tubing wall, they are immediately adjacent to one another. In some applications when the conductors are used for warming, heating, or maintaining the temperature of a tidal air flow in the tubing by means of resistance heating, for example, the heating from these conductors is concentrated at their location. It may be desirable for the conductors to not be immediately adjacent to one another so that heating is somewhat more dispersed. Further, when plural conductors are disposed in such a tubing wall, and one or more of the conductors is utilized for conducting instrumentation or telemetry signals, then it is also desirable for the conductors to be spaced apart a controlled and determined distance for purposes of preserving signal clarity and fidelity, for insuring electrical insulation between the conductors, and for preventing or reducing mutual inductive coupling among the conductors, including the heating conductors and the signal conductors. Particularly, it would be an advantage to provide a form of instrumentation conductor which better preserves signal quality.

No prior product, method of manufacture, or apparatus is known which provides a thin-walled, smooth-bore tube having plural spaced apart conductors helically imbedded in the outer structure of the tube and which conductors are available for heating of tidal air flow in the tube, as well as for instrumentation or telemetry signals to be conducted along the length of the tube, with an instrumentation conductor arrangement that well preserves the quality of signals transmitted along the tube, all with a smooth bore and a helically ribbed but substantially crevice-free outer surface.

Those ordinarily skilled in the pertinent arts and familiar with U.S. Pat. No. 3,910,808 to Steward will understand that tubing of the type described in this application is generally manufactured using an apparatus including a winding or wrapping head having plural (usually 4) cantilevered and rotationally driven winding rolls. These winding rolls are canted both axially and radially, and are spaced about a longitudinal axis for winding and rotationally advancing a helically wound and ribbed flexible tubing. The winding rolls rotate in unison while a molten plastic ribbon is helically wrapped on itself and integrally heat bonds to form a spinning and axially advancing tubing wall. The tubing is cooled internally and externally by air, water, or a combination thereof, delivered and directed onto the forming tubing so as to allow the molten plastic ribbon and other parts to fuse, and to accomplish solidification and cooling of the plastic. While the tubing is being formed, conductors are placed onto or within the tubing wall, and an outer molten bead is wrapped helically along the tubing wall atop of the conductors. The bead integrally heat bonds to become a part of the tubing wall. The tubing is cooled finally in an immersion water bath, and is then cut into determined lengths.

SUMMARY OF THE INVENTION

In view of the deficiencies of the related art as discussed above, it is a primary object of the present invention to provide a flexible, lightweight, crush-resistant tubing having an arrangement of conductors which is particularly advantageous for conveying instrumentation signals, and a supporting bead helically wound about and integral with the wall of the tubing.

It is another object of this invention to provide such a tubing in which the wall of the tubing provides an elevated helical plateau, in which one or more helical grooves or crevices are defined, and into which the one or more conductors are disposed and spaced uniformly and helically about and along the length of the tubing, to there be integrally covered by a support bead.

Still another object for this invention is to provide a tubing as described immediately above, and in which the conductors include at least one instrumentation conductor arrangement (preferably in the form of a twisted pair set of conductors) which well preserves the quality of instrumentation signals transmitted along this instrumentation conductor arrangement. An upper or cap portion of the support bead retains and protects the conductor(s) of the tubing.

These and other objects are achieved by the present invention which provides: a thin-walled, flexible and collapse-resistant thermo-plastic tubing having a substantially smooth bore and a helical outer support bead structure, the tubing including at least one conductor helically disposed within the support bead structure, the tubing comprising; a flexible tubing wall formed of an elongate thermoplastic ribbon including a comparatively thinner wall portion and a comparatively thickener plateau portion, the plateau portion defining at least one elongate fine-dimension groove, the ribbon while molten being helically wrapped repeatedly on itself to partially overlap successive wraps of the ribbon a certain amount forming a helical lap joint where successive wraps of the ribbon heat-bond integrally to one another so that an elongate tubular body is formed; at least one elongate conductor disposed in the elongate fine-dimension groove of the plateau portion and helically around and along the elongate tubular body; an elongate thermoplastic support bead portion disposed helically around and along the elongate tubular body atop of the plateau portion and at least one conductor, the support bead portion integrally heat-bonding to the ribbon so that the plateau portion and the support bead portion cooperatively form the bead structure, and the tubing comprises a unitary thin-walled tubing structure with helical outer support bead and embedded conductor(S) extending helically about and along the tubing.

For resistance heating purposes, the wire conductor is preferably formed of copper, although resistive metal such as nickel-chromium may also be utilized. For telemetry purposes, the conductor(s) may be any suitable conductive material, including metals and conductive polymers, for example. A conductor which conducts light may also be employed (i.e., a fiber-optic conductor). Further, one or more of the conductors may comprise a twisted-pair of electrical conductors, which provides unique properties in terms of inductive and capacitive coupling among the conductors.

Further applications of the present invention will be apparent to those skilled in the art from a consideration of a fully detailed exemplary embodiment thereof. To aid in the explanation of the exemplary embodiment, reference will be made to the figures of the appended sheets of drawings, which figures will first be described briefly.

BRIEF DESCRIPTION OF THE DRAWING FIGURES

Figure 2:
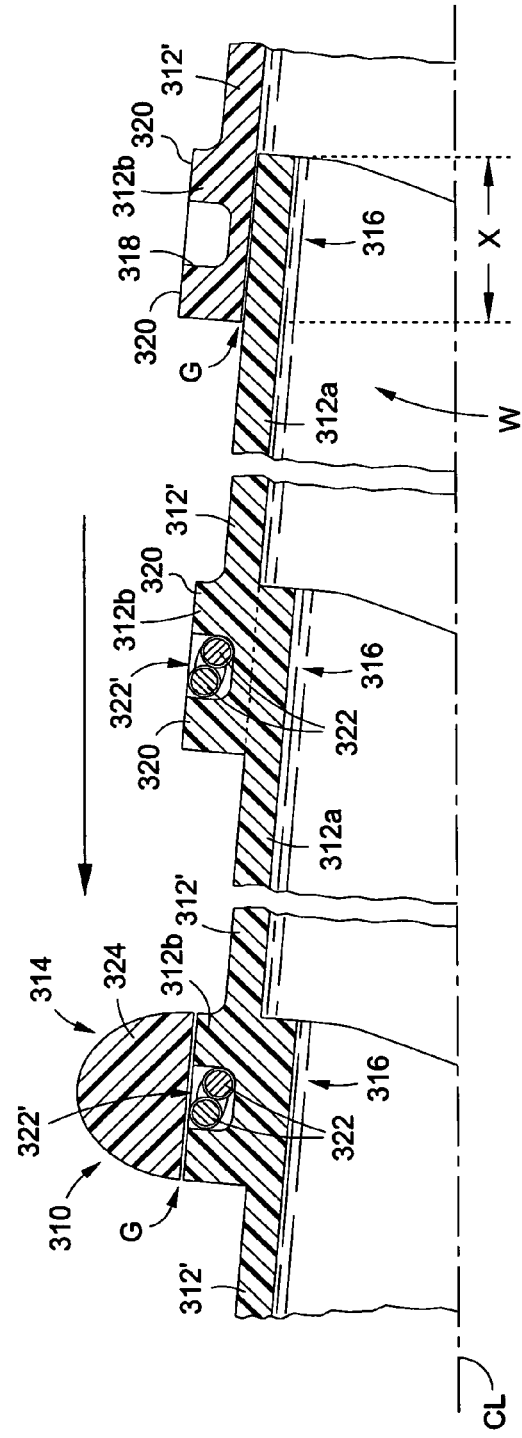
Figure 3:
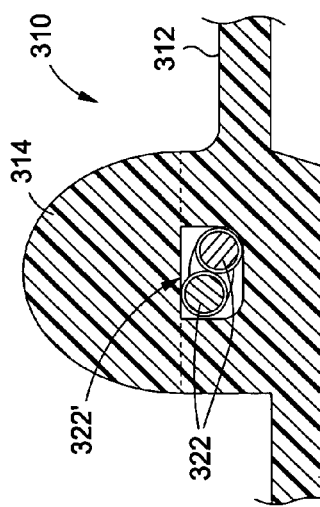
Figure 4:
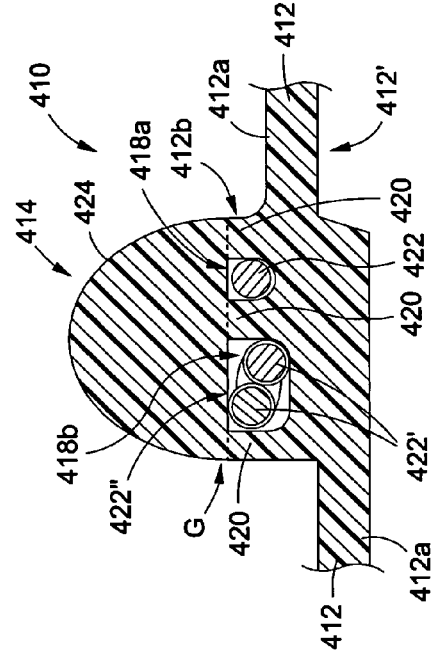
Figure 5:
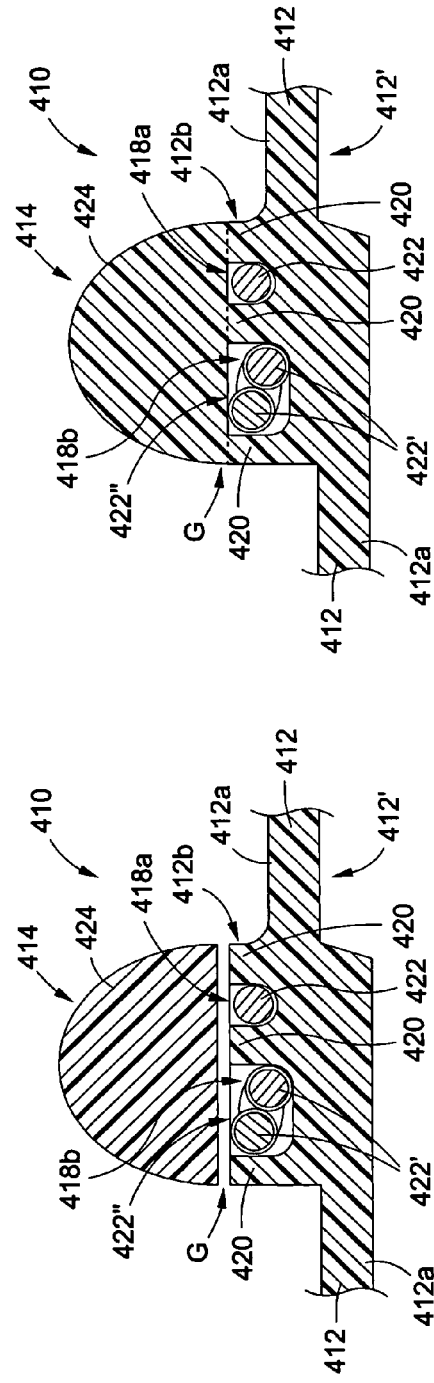

The advantages and features of the present invention will be better understood by the following description when considered in conjunction with the accompanying drawings in which:

FIG. 1 provides an exterior view of a tubing according to this invention;

FIG. 2 is a fragmentary cross sectional view of the tubing seen in FIG. 1, and is seen during the manufacturing process;

FIG. 3 provides a fragmentary cross sectional view of an elongate section of the wall of the tubing seen in FIGS. 1 and 2 during manufacture;

FIGS. 4 and 5 provide fragmentary cross sectional views of an elongate section of an alternative embodiment of tubing, and are similar to that of FIGS. 2 and 3, respectively; and FIGS. 6 and 7 provide a fragmentary cross sectional views of an elongate section of another alternative embodiment of tubing, and are also similar to that of FIGS. 2 and 3, respectively.

DETAILED DESCRIPTION OF EXEMPLARY PREFERRED EMBODIMENTS OF THE INVENTION

Considering now FIGS. 1-3 in conjunction with one another, and viewing first FIG. 1, it is seen that the tubing 310 according to this invention has an exterior appearance essentially the same as conventional tubing of this type. That is, the tubing has a comparatively thin and flexible wall 312, and a helical bead 314 protruding somewhat above this wall and extending helically about and along the length of the tubing. As will be seen, the tubing 310 also includes embedded conductors (not seen in FIG. 1) extending helically about and along the tubing 310 at the bead 314. That is, the conductors extend about and along the length of tubing 310 from end to end. Advantageously, particular embodiments of the present tubing include an arrangement of conductors which well preserves the quality of instrumentation signals conveyed along the length of the tubing. Other embodiments of the present tubing include conductors which are especially disposed within the tubing so as to have an advantageous thermal conductivity to tidal air flow in the tubing, and to be well insulated from ambient.

Viewing now FIG. 2, which illustrates both structures as well as steps in the process of making the present inventive tubing, it is seen that the wall 312 is formed by successive helical wraps of an elongate thin thermoplastic ribbon 312'. This thermoplastic ribbon 312' is initially in molten condition, having just been discharged from the die of a plastic extrusion machine (not seen in the drawing Figures). At the right-hand side of FIG. 2, the most recently extruded portion of ribbon 312' is about to touch down (note the slight gap "G") on a previously extruded portion of ribbon 312' which is wrapped about spinning winding rolls (also not seen in the drawing Figures). Thus, the tubing structure forming in FIG. 2 is spinning about its centerline, indicated at "CL."

The ribbon 312' includes a rather thin and flexible portion 312a extending axially between adjacent beads 314 along the length of the tubing 310, as seen in FIG. 1. This thin portion 312a forms the wall 312 seen in FIG. 1. The ribbon 312' also includes a somewhat thickened plateau portion 312b which is disposed beneath the bead 314 seen in FIG. 1. That is, the plateau portion 312b is an integral portion of the ribbon 312', and protrudes radially outwardly relative to the thinner portion 312a to form a base or foundation upon which the bead 314 secures.

As is seen best at the right hand end of FIG. 2, just before the moment a successive wrap of the ribbon 312' touches a preceding wrap (again, note the slight gap "G"), the wraps of ribbon 312' are distinct from one another in axial cross section (but are integral with one another helically along the length of the ribbon 312'—that is, around the winding rolls), and the successive wraps of ribbon 312' as they touch and interbond form a wrap or overlap joint, indicated with arrow 316 (note the overlap dimension "X" indicated in FIG. 2).

In other words, as the wraps of ribbon 312' touch they bond together, and as is seen at the next lap joint 316 to the left in FIG. 2, the successive wraps of ribbon 312' have touched at joint 316 and heat bonded to one another (i.e., the ribbon is molten thermoplastic at this time), and the wraps of ribbon 312' are now integral with one another both helically and axially along the length of the tubing 310. It is for this reason that the cross hatching of FIG. 2 shows the tubing structure 310 becoming an integral whole. The joint lines at what were once individual parts may be indicated in the various drawing Figures with dashed lines as on FIG. 2, but the structure of the plastic tubing 310 is a unity. Again, it will be recalled that the tubing 310 during manufacture is both spinning about its axis (i.e., about centerline "CL"), and as it is formed is moving leftwardly relative to the viewer of FIG. 2, as is indicated by the left-facing arrow on FIG. 2. Also, the inner surface of the wraps of primary ribbon 312' (i.e., disposed toward the centerline indicated on FIG. 2) is being actively cooled by a water spray, indicated on FIG. 2 by the arrow "W". Moreover, the change in status of the successive wraps of ribbon 312' denoting the formation of a integral tubular body is indicated on FIG. 2 by the successive changes from distinct cross hatches, to an integral or uniform cross hatch both for the successive wraps of ribbon 312' and other parts of the tubing 310.

At the plateau portion 312b the primary ribbon 312' (and tubing 310) includes a groove 318 bounded by a respective rib parts 320 of the plateau portion 312b. Disposed within this groove 318 are two individual conductors 322 (viewing FIGS. 2 and 3). The individual conductors 322 each include an outer layer of insulation (which is too thin to be individually illustrated in the drawing Figures), so that although the conductors 322 are twisted about one another, they are insulated from one another. An example of conductors 322 that may be utilized are insulated magnet wire conductors of 29 gauge or finer. Also importantly, it is seen that the conductors 322 are configured as a twisted-pair conductor set, indicated with the arrowed numeral 322'. The twisted pair conductor set 322' runs helically about and from end to end of a length of the tubing 310. Again, it will be understood that the conductor set 322' is wrapped into the groove 318 as the progressively forming tubing 310 spins on the wrapping rolls described earlier.

FIG. 2 also shows that very shortly after the placement of the conductor set 322' within groove 318 of the ribbon 312' a bead portion 324 is extruded (i.e., molten plastic) and is disposed on top of the ribbon 312' and conductor set 322' at plateau 312b. So the plateau portion 312b of ribbon 312' forms a base or foundation upon which the bead portion 324 secures. Together, the plateau portion 312b and bead portion 324 form the bead 314 seen on the outside of tubing 310 in FIG. 1. The moment after touch down of the bead portion 324 atop of the ribbon 312' is depicted in FIG. 3. FIG. 3 illustrates that the plastic components of the tubing 10 heat bond with one another into a unitary whole, carrying the conductor set 322'.

It will be appreciated by those ordinarily skilled in the pertinent arts that because the conductor set 322' is configured as a twisted pair of individual conductors 322, the conductor set 322' well provides for preservation of the quality of instrumentation signals conducted along this conductor set. That is, the effects are minimized of mutual capacitive coupling and mutual inductive coupling of the conductor set 322' to interference sources of electro-magnetic radiation or interference within or adjacent to the tubing 310, as well as in the environment. It will be understood as well that the circumstances in which the tubing 310 is likely to be used (i.e., the home, or a clinic or hospital, for example, are rich with sources of electro-magnetic interference). It is also well understood that even low-power sources of electro-magnetic interference, such as cell phones, for example, can possibly interfere with instrumentation signals. Moreover, as will be seen, the effects of coupling of conductor set 322' to other sources of interference, even those within or immediately adjacent to a tubing such as tubing 310 itself are minimized by the construction of the present inventive tubing, as will be further explained below.

Considering now FIGS. 4 and 5 in conjunction with one another, and viewing first FIG. 4, it is seen that the making of an alternative embodiment of tubing 410 is depicted. Because this alternative embodiment of tubing 410 includes many features that are the same as, or which are analogous in structure or function to, those of the first embodiment of FIGS. 1-3, these features are referenced by the same numeral used above, and increased by one-hundred (100). The tubing 410 has an exterior appearance essentially the same as conventional tubing of this type, and the same as the tubing 310 of FIGS. 1-3. That is, the tubing 410 has a comparatively thin and flexible wall 412, and a helical bead 414 protruding somewhat above this wall and extending helically about and along the length of the tubing. The tubing 410 also includes embedded conductors extending helically at the bead 414 and along the length of tubing 410 from end to end.

Viewing now FIG. 4 in greater detail, (which is much like FIG. 2, with the exception of showing the process steps of manufacture in a condensed illustration) both structures as well as steps in the process of making an inventive tubing 410 are seen. That is, it is seen that the wall 412 is formed by successive helical wraps of an elongate thin thermoplastic ribbon 412'. The ribbon 412' also includes a thin wall portion 412a, and a plateau portion 412b defining a pair of un-equal spaced apart grooves 418 (distinguished from one another by the suffix characters "a" and "b") each bounded by a respective rib part 420 of the plateau portion 412b. Disposed within these grooves 418a and 418b are separated from one another by the ribs 420 are conductors 422 and 422'. One of the conductors 422 is placed alone in the smaller groove 418a of the pair of grooves 418a. On the other hand, a pair of the conductors 422' is placed into the larger groove 418b of the pair of grooves. The conductors 422' in groove 418b are arranged in a twisted pair set, indicated with arrowed numeral 422". Like the twisted pair set 322' of the first embodiment, the twisted pair set 422" well provides for the preservation of instrumentation signals conveyed along this conductor set.

FIGS. 4 and 5 also show that very shortly after the placement of the conductors 422 and 422" within the grooves 418a and 418b, a bead portion 424 is extruded (i.e., molten plastic) and is disposed on top of the ribbon 412' and conductors 422 and 422' at plateau 412b. So the plateau portion 412b of ribbon 412' forms a base or foundation upon which the bead portion 424 secures. Together, the plateau portion 412b and bead portion 424 form the bead 414 seen on the outside of tubing 410 (which outwardly appears just like the tubing 110 see in FIG. 1). The moment after touch down of the bead portion 424 atop of the ribbon 412 is depicted in FIG. 5, illustrating that the plastic components of the tubing 410 heat bond with one another into a unitary whole, carrying the conductors 422 and 422'.

Considering now FIGS. 6 and 7 in conjunction with one another, and viewing first FIG. 6, it is seen that the making of yet another alternative embodiment of tubing 510 is depicted. Because this alternative embodiment of tubing 510 includes many features that are the same as, or which are analogous in structure or function to, those of the first embodiment of FIGS. 1-3, these features are referenced by the same numeral used above, and increased by two-hundred (200). The tubing 510 has an exterior appearance essentially the same as conventional tubing of this type, and the same as the tubing 310 of FIGS. 1-3, and the tubing 410 of FIGS. 4 and 5. That is, the tubing 510 has a comparatively thin and flexible wall 512, and a helical bead 514 protruding somewhat above this wall and extending helically about and along the length of the tubing. The tubing 510 also includes embedded conductors extending helically at the bead 514 and along the length of tubing 510 from end to end.

Viewing now FIG. 6, (which is much like FIGS. 2 and 4) both structures as well as steps in the process of making an inventive tubing 510 are illustrated. It is seen in FIG. 6 that the wall 512 is formed by successive helical wraps of an elongate thin thermoplastic ribbon 512'. The ribbon 512' also includes a thin wall portion 512a, and a plateau portion 512b defining three spaced apart grooves 518 each bounded by a respective rib part 520 of the plateau portion 512b. It is seen that the grooves 518 include a pair of comparatively deep grooves 518a, which are spaced on opposite axial sides of a comparatively shallow central groove 518b. Disposed within these grooves 518a and 518b and separated from one another by the ribs 520 are individual conductors 522. The most widely spaced apart pair of conductors 522a (i.e., those in grooves 518a, are spaced from, but are radially closer to, the bore of the tubing 510 than is the conductor 522b in the central groove 518b. Consequently, it is to be understood that the conductors 522a and 522b are radially spaced, as well as axially spaced from one another.

As explained above, one of the conductors 522b is preferably placed centrally in the shallower groove 518b, and another pair of the conductors 522a is also placed into the deeper grooves 518a. Consequently, the conductors 522a in the deeper grooves 518a are closer to the bore of tubing 510 than is the conductor in groove 518b, and thus have a greater heat transfer conductivity (i.e., lower thermal resistance) to fluid flowing in the tubing 510. Thus, the conductors 522a in grooves 518a are most favorably arranged for use as resistive heating conductors relative to fluid flow in the tubing 510. On the other hand, the conductor 522b in shallower groove 518b is spaced from the conductors 522a in grooves 518a both radially and axially, and thus has a greater capacitance value relative to the other conductors 522a. This conductor 522b is thus favorably disposed for use as an instrumentation conductor.

FIGS. 6 and 7 also show that very shortly after the placement of the conductors 522a and 522b within the grooves 518a and 518b, a bead portion 524 is extruded (i.e., molten plastic) and is disposed on top of the ribbon 512' and conductors 522 at plateau 512b. So the plateau portion 512b of ribbon 512' forms a base or foundation upon which the bead portion 524 secures. Together, the plateau portion 512b and bead portion 524 form the bead 514 seen on the outside of tubing 510 as is seen in FIG. 7 (recalling also the appearance of the tubing 310 illustrated in FIG. 1). The moment after touch down of the bead portion 524 atop of the ribbon 512' is depicted in FIG. 7, which illustrates that the plastic components of the tubing 510 heat bond with one another into a unitary whole, carrying the conductors 522 therein.

It will be understood that during and after formation of the tubing constructions 310, 410, and 510 as described above, the tubing is subjected to cooling, which may include a conduit disposed within the winding head and which sprays water directed radially outwardly against the inner surface of the tubing as it forms (i.e., water spray "W" described by reference to FIG. 2). Also, to the left (i.e., in the direction of axial movement of the forming tubing) of the manufacturing steps indicated in FIGS. 2, 4, and 6 (i.e., outside of the view of these Figures) is conventionally disposed a cooling trough containing water into which the tubing enters as it proceeds leftwardly (recalling the motion arrow on FIG. 2). The cooling water in this trough finishes cooling of the tubing product from its molten condition to a finished flexible plastic integral tubular product. Conventionally, the tubing is then cut into pre-selected lengths for storage or shipment in a box.

The resulting tubing 310, 410, 510 includes a thin flexible wall section (for example, formed by the portion 312a of ribbon 312' apart from the plateau portion 312b) extending between adjacent wraps of the bead 314, as is seen best in FIG. 1. This thin flexible wall portion provides for exceptional flexibility for the tubing, while the bead 314 provides support for the wall so that the tubing is kink and collapse-resistant. Also, the conductors disposed at the bead have desirable electrical properties when used to convey electrical signals. And may be used to provide resistance heating to the tubing as well. On the other hand, telemetry or instrumentation signals (i.e., light, fiber optic, or electrical) may be conducted along the conductors. Moreover, the spacing and disposition of the conductors as seen in FIGS. 6 and 7 particularly can provide an improved heat transfer coefficient to fluid flow within the tubing, as well as improved insulation of the resistance heating conductors from one another and from ambient. Also, an improved capacitance value between the conductors (and improved uniformity of this capacitance value), and reduced mutual inductive coupling among the conductors can be achieved, particularly with respect to the embodiments of the present tubing including a twisted pair conductor set. The embodiments providing a twisted pair conductor set construction provides advantages for signal transmission which are well understood in the fields of telephony and telemetry. Finally, the inventive tubing product here disclosed in FIGS. 6 and 7 provides unique advantages because of the dual-level (i.e., radially spaced) disposition of the conductors at the bead of the tubing, and the resulting greater thermal conductivity of the spaced apart pair of conductors with fluid flow inside the tubing, combined with reduced capacitive and inductive coupling of the resistance heating conductor pair with the third conductor—having advantages for use as an instrumentation conductor.

While exemplary forms or embodiments of the invention has been shown in the drawings and described herein, variations from these exemplary forms will be apparent to those skilled in the art. For example, a tubing providing a duality or plural twisted pair conductor sets disposed within a bead of the tubing is clearly within the ambit of this invention. Similarly, a tubing having conductors disposed within a bead structure of the tubing and at differing radial levels (i.e., radially spaced) relative to the center of the tubing and relative to one another is also part of this invention. The invention therefore should not be construed as limited to the specific forms shown and described, but instead as is set forth in the following claims, which provide a definition of the invention.

What is claimed is:

1. A thin-walled, flexible and collapse-resistant thermoplastic tubing having a substantially smooth bore and a helical outer support bead structure, the tubing including at least one conductor helically disposed within said support bead structure, said tubing comprising:

a flexible tubing wall formed of an elongate thermoplastic ribbon including a comparatively thinner wall portion and a comparatively thicker plateau portion, said plateau portion defining at least one elongate fine-dimension groove, said ribbon while molten being helically wrapped repeatedly on itself to partially overlap successive wraps of said ribbon a certain amount forming a helical lap joint where successive wraps of said ribbon heat-bond integrally to one another so that an elongate tubular body is formed;

at least one elongate conductor disposed in said elongate fine-dimension groove of said plateau portion and helically around and along said elongate tubular body;

an elongate thermoplastic support bead portion disposed helically around and along said elongate tubular body atop of said plateau portion and at least one conductor, said support bead portion integrally heat-bonding to said ribbon so that said plateau portion and said support bead portion cooperatively form said bead structure, and said tubing comprises a unitary thin-walled tubing structure with helical outer support bead and embedded conductor extending helically about and along said tubing.

2. The tubing of claim 1 wherein said at least one conductor includes a twisted pair conductor set, in which a pair of conductors are insulated from one another and twisted about one another before being disposed in said elongate groove of said ribbon forming said tubular body.

3. The tubing of claim 1 wherein said at least one conductor includes a resistance heating conductor which is in heat transfer relation with fluid flow within said tubular body.

4. The tubing of claim 1 wherein said plateau portion defines a pair of grooves, and one of said pair of grooves receives a twisted pair conductor set, in which a pair of conductors are insulated from one another and twisted about one another before being disposed in said one of said pair of grooves of said ribbon forming said tubular body, and a second of said pair of grooves receives a single conductor.

5. The tubing of claim 1 wherein said plateau portion defines plural elongate grooves in parallel, and said plural elongate grooves include grooves of differing depth, plural conductors received each in a respective one of said plural elongate grooves of differing depth so that said conductors are spaced from one another both axially and radially within said tubular body.

6. The tubing of claim 5 wherein said plural conductors include at least a twisted pair set of conductors disposed together in one of said plural grooves in parallel of said ribbon of said tubular body.

7. A method for making a helically wound, seamless plastic tubing comprising the steps of:
   forming an elongate ribbon of molten thermoplastic having a thin portion and a thickened plateau portion including at least one elongate groove, helically wrapping said elongate ribbon so that said plateau portion overlaps a part of said thin portion to form a helical lap joint and simultaneously heat-bonding said ribbon to itself to form an elongate tubular body with said plateau portion extending radially outwardly on and helically along said tubular body;
   laying an elongate conductor helically around and along said tubular body within said at least one elongate groove of said plateau portion;
   forming an elongate bead of thermoplastic material; and
   helically wrapping said bead about and along said tubular body atop said conductor and plateau portion, while simultaneously heat-bonding said bead integrally with said tubular body to form a unitary tubing including said ribbon and said bead with said conductor embedded therein.

8. The method of claim 7 wherein the step of laying said conductor in said at least one elongate groove includes the step of forming said conductor as one of a twisted pair conductor set, with said twisted pair conductor set including at least a pair of conductors insulated from one another and twisted about one another.

9. The method of claim 8 further including the steps of utilizing said plural grooves to define plural ribs on said plateau portion.

10. The method of claim 8 further including the step of providing for said plateau portion to define plural grooves in parallel, and plural ribs bracketing and separating individual ones of said plural grooves, and providing for said grooves and ribs to cooperatively guide plural conductors into repose within said plural grooves of said plateau portion.

11. The method of claim 10 wherein said step of forming said plural grooves includes the step of forming a larger groove for receiving a twisted pair conductor set, and forming a smaller groove for receiving a single conductor.

12. The method of claim 10 wherein said step of forming said plural grooves includes the step of forming at least a shallow groove as one of said plural grooves, and forming a deeper groove as one of said plural grooves, and disposing in said deeper groove a resistance heating conductor, whereby said resistance heating conductor provides a desirably high heat transfer coefficient to fluid flow within said tubular body.

13. A smooth-bore flexible tubing with helical outer support bead, said tubing comprising:
   an elongate thermoplastic ribbon helically wrapped and partially overlapped onto itself and mutually heat bonded to itself to form a flexible tubular body, said thermoplastic ribbon including an elongate fine-dimension portion and a comparatively thickened elongate plateau portion extending radially outwardly and helically about and along said flexible tubing;
   plural conductors disposed helically about and along said flexible tubing at said plateau portion;
   at least a pair of said plural conductors being configured as a twisted pair conductor set; and
   an elongate thermoplastic support bead disposed helically around and along said tubing atop of said plateau portion and said twisted pair conductor set, said support bead integrally heat-bonding to said tubular body to form a unitary thin-walled tubing structure with helical outer support bead and embedded conductors, whereby, said embedded conductors are configured to include a twisted pair conductor set providing reduced coupling to sources of electro-magnetic interference.

14. The tubing of claim 13 wherein said tubular body further includes a resistance heating conductor for providing resistance heating to fluid flowing within said tubular body.

* * * * *